US012689954B2

(12) United States Patent　　　　(10) Patent No.: US 12,689,954 B2

Gürsu et al.　　　　　　　　　　　(45) Date of Patent: Jul. 21, 2026

---

(54) FALLBACK CONDITIONAL HANDOVER CONFIGURATION WITH SINGLE CONNECTIVITY

(71) Applicant: Nokia Technologies Oy, Espoo (FI)

(72) Inventors: Halit Murat Gürsu, Munich (DE); Umur Karabulut, Munich (DE); Ahmad Awada, Munich (DE); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 597 days.

(21) Appl. No.: 17/980,662

(22) Filed: Nov. 4, 2022

(65) Prior Publication Data

US 2024/0155450 A1　　May 9, 2024

(51) Int. Cl.
*H04W 36/00* (2009.01)

(52) U.S. Cl.
CPC . *H04W 36/00837* (2018.08); *H04W 36/0058* (2018.08)

(58) Field of Classification Search
CPC ..................... H04W 36/00837; H04W 36/0058
USPC .......................................................... 370/331
See application file for complete search history.

(56) References Cited

U.S. PATENT DOCUMENTS

| | | |
|---|---|---|
| 2019/0223073 A1 | 7/2019 | Chen et al. |
| 2021/0258843 A1 | 8/2021 | Awada et al. |

| | | | |
|---|---|---|---|
| 2021/0258852 A1 | 8/2021 | Selvaganapathy et al. | |
| 2023/0047617 A1* | 2/2023 | Kumar ............ | H04W 36/00838 |
| 2023/0097891 A1* | 3/2023 | Zhang ............. | H04W 36/00837 370/331 |
| 2023/0370907 A1* | 11/2023 | Hwang ............. | H04W 36/0058 |
| 2024/0056935 A1* | 2/2024 | Hwang ............. | H04W 36/0069 |
| 2024/0080703 A1* | 3/2024 | Kim ..................... | H04W 76/11 |
| 2024/0114420 A1* | 4/2024 | Purkayastha ..... | H04W 36/0069 |
| 2024/0121689 A1* | 4/2024 | Lim ...................... | H04W 76/20 |
| 2024/0306056 A1* | 9/2024 | Jin ......................... | H04W 4/40 |
| 2025/0133471 A1* | 4/2025 | Wang ............. | H04W 36/00837 |
| 2025/0142439 A1* | 5/2025 | Min ...................... | H04W 76/15 |

FOREIGN PATENT DOCUMENTS

| | | |
|---|---|---|
| JP | 2021510272 A | 4/2021 |
| JP | 2022521073 A | 4/2022 |
| WO | 2020222271 A1 | 11/2020 |

OTHER PUBLICATIONS

International Preliminary Report on Patentability for PCT Pat. App. No. PCT/EP2023/079751 mailed Apr. 29, 2025 (9 pages).
International Search Report and Written Opinion for PCT Pat. App. No. PCT/EP2023/079751 mailed Jan. 30, 2024 (13 pages).

(Continued)

*Primary Examiner* — Faisal Choudhury

(74) *Attorney, Agent, or Firm* — BURR & FORMAN LLP

(57)　　　　　ABSTRACT

An apparatus including at least one processor; and at least one non-transitory memory storing instructions that, when executed with the at least one processor, cause the apparatus to: determine that a conditional handover condition is met; and based upon the determining that the conditional handover condition is met and based, at least partially, on a priority information, select a conditional handover configuration from at least one conditional handover configuration to perform a conditional handover.

18 Claims, 7 Drawing Sheets

(56)             References Cited

OTHER PUBLICATIONS

Jedrzej Stanczak et al: "On Conditional Handover with Candidate SCGs for CPAC", 3GPP Draft; R2-2212265; Type Discussion; NR MOB_ENH2-CORE, 3rd Generation Partnership Project (3GPP), Mobile Competence Centre; 650, Route Des Lucioles ; F-06921 Sophia-Antipolis Cedex ; France; vol. 3GPP RAN 2, No. Toulouse, FR; Nov. 14, 2022-Nov. 18, 2022 Nov. 3, 2022 (Nov. 3, 2022), XP052216349, Retrieved from the Internet: URL:https://www.3gpp.org/ftp/TSG_RAN/WG2_R L2/TSGR2_120/Docs/R2-2212265.zip.
Examination Report issued in corresponding Australian Patent Application No. 2023374287 mailed Mar. 12, 2026, all pages cited in its entirety.
Notice of Reasons for Refusal (with English Translation) issued in corresponding Japanese Patent Application No. 2025-525040 mailed Mar. 31, 2026, all pages cited in its entirety.
Office Action and Search Report issued in corresponding Canadian Patent Application No. 3,272,608 mailed Apr. 1, 2026, all pages cited in its entirety.

\* cited by examiner

FALLBACK CONDITIONAL HANDOVER CONFIGURATION WITH SINGLE CONNECTIVITY

BACKGROUND

Technical Field

The example and non-limiting embodiments relate generally to wireless communication and, more particularly, to conditional handover.

BRIEF DESCRIPTION OF PRIOR DEVELOPMENTS

Conditional handover procedures are generally known in regard to a user equipment in a wireless network.

SUMMARY

The following summary is merely intended to be an example. The summary is not intended to limit the scope of the claims.

In accordance with one aspect, an example embodiment may be provided with an apparatus comprising: at least one processor; and at least one non-transitory memory storing instructions that, when executed with the at least one processor, cause the apparatus to: determine that a conditional handover condition is met; and based upon the determining that the conditional handover condition is met and based, at least partially, on a priority information, select a conditional handover configuration from at least one conditional handover configuration to perform a conditional handover.

In accordance with another aspect, an example method may be provided comprising: determining that a conditional handover condition is met by a user equipment; and based upon the determining that the conditional handover condition is met and based, at least partially, on a priority information, selecting by the user equipment a conditional handover configuration from at least one conditional handover configuration to perform a conditional handover.

In accordance with another aspect, an example embodiment may be provided with a non-transitory program storage device readable by an apparatus, tangibly embodying a program of instructions executable with the apparatus for performing operations, the operations comprising: determining that a conditional handover condition is met; and based upon the determining that the conditional handover condition is met and based, at least partially, on a priority information, selecting a conditional handover configuration from at least one conditional handover configuration to perform a conditional handover.

In accordance with another aspect, an example embodiment may be provided with an apparatus comprising: at least one processor; and at least one non-transitory memory storing instructions that, when executed with the at least one processor, cause the apparatus to: receive handover information; and based, at least partially, upon the receiving of the handover information, send the handover information to a user equipment with conditional handover priority information.

In accordance with another aspect, an example method may be provided comprising: receiving handover information comprising measurement configuration information; and based, at least partially, upon the receiving of the handover information, sending the handover information to a user equipment with conditional handover priority information.

In accordance with another aspect, an example embodiment may be provided with a non-transitory program storage device readable by an apparatus, tangibly embodying a program of instructions executable with the apparatus for performing operations, the operations comprising: receiving handover information comprising measurement configuration information; and based, at least partially, upon the receiving of the handover information, sending the handover information to a user equipment with conditional handover priority information.

BRIEF DESCRIPTION OF THE DRAWINGS

The foregoing aspects and other features are explained in the following description, taken in connection with the accompanying drawings, wherein.

DETAILED DESCRIPTION

Figure 1:
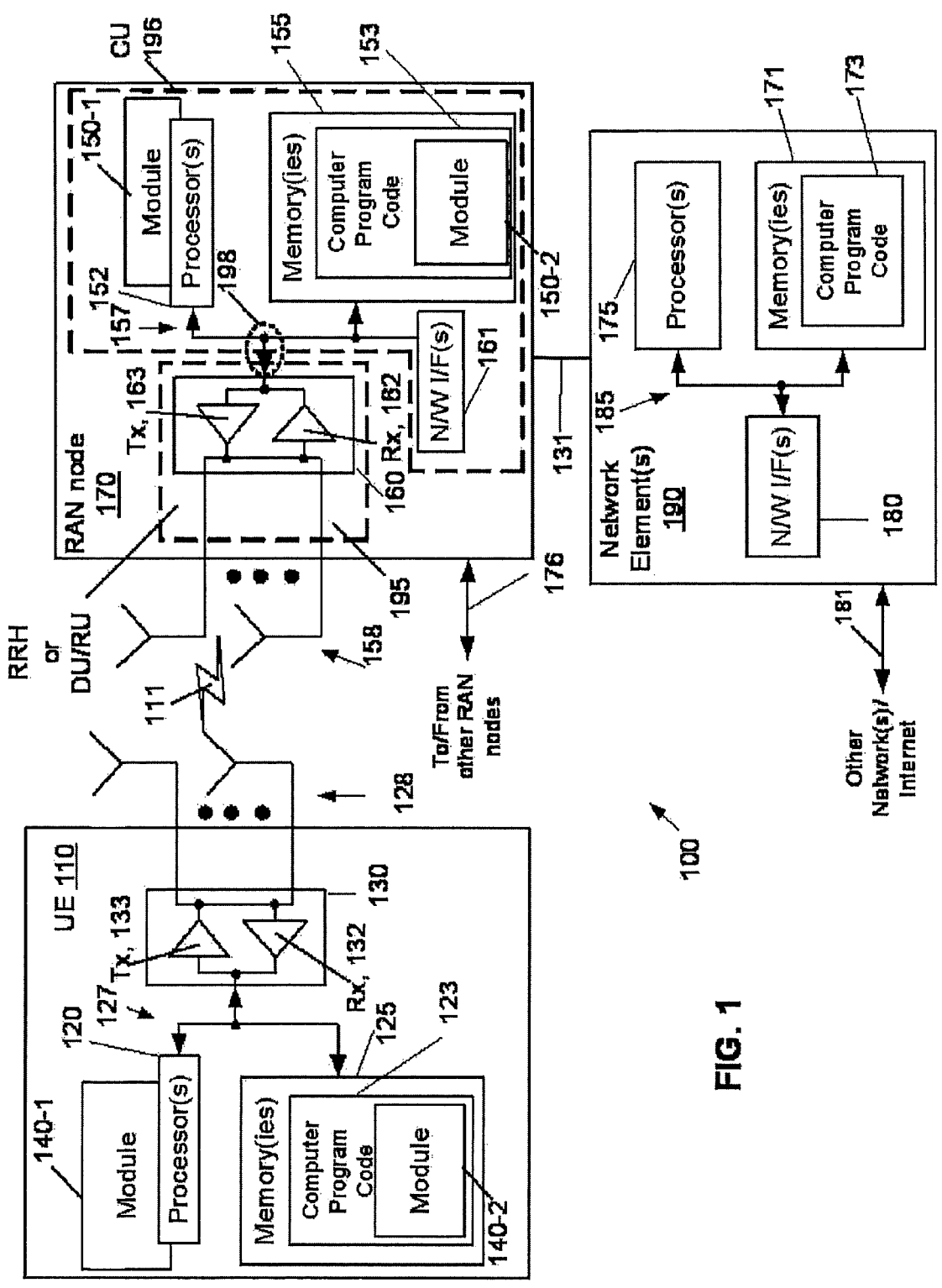
FIG. 1 is a block diagram of one possible and non-limiting exemplary system in which the exemplary embodiments may be practiced.

Features as described herein generally relate to enhancements of conditional handover (CHO) with a Secondary Cell Group (SCG) configuration.

The following abbreviations that may be found in the specification and/or the drawing figures are defined as follows:

3GPP third generation partnership project
5G fifth generation
5GC 5G core network
AMF access and mobility management function
CHO conditional handover
CPA conditional PSCell addition
CPAC conditional PSCell addition/change
CPA/CPA conditional PSCell change/addition
CPC conditional PSCell change
CU central unit
DC dual connectivity
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface LTE long term evolution
MAC medium access control
MCG master cell group
MME mobility management entity
MN master node
ng or NG new generation
ng-eNB or NG-eNB new generation eNB
NR new radio
N/W or NW network
PCell primary serving cell
PSCell primary secondary cell
PDCP packet data convergence protocol
PHY physical layer
RAN radio access network
Rel release
RLC radio link control
RLF radio link failure
RRH remote radio head
RRC radio resource control
RU radio unit
Rx receiver
SCG secondary cell group
SDAP service data adaptation protocol
SGW serving gateway
SMF session management function
TS technical specification
TTT time to trigger
Tx transmitter
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module, comprising one of or both parts 140-1 and/or 140-2, which may be implemented in a number of ways. The module may be implemented in hardware as module 140-1, such as being implemented as part of the one or more processors 120. The module 140-1 may be implemented also as an integrated circuit or through other hardware such as a programmable gate array. In another example, the module may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module, comprising one of or both parts 150-1 and/or 150-2, which may be implemented in a number of ways. The module may be implemented in hardware as module 150-1, such as being implemented as part of the one or more processors 152. The module 150-1 may be implemented also as an integrated circuit or through other hardware such as a programmable gate array. In another example, the module may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Conditional handover (CHO) with Secondary Cell Group (SCG) configuration is being discussed in mobility enhancement Rel. 18 work item. The mobility enhancements WID objective 3 and 4 are as follows [RP-213565]:

3. To specify CHO including target MCG and target SCG [RAN3, RAN2].

Note 5: This is already being targeted for Rel-17, so this objective will be reviewed at RAN #95-e.

4. To specify CHO including target MCG and candidate SCGs for CPC/CPA [RAN3, RAN2] CHO including target MCG and target SCG is used as the baseline In the following, an overview of CHO in Rel. 16 and its evolution in Rel. 17 towards Rel. 18 is provided.

Conditional Handover (Rel. 16)

Figure 2:
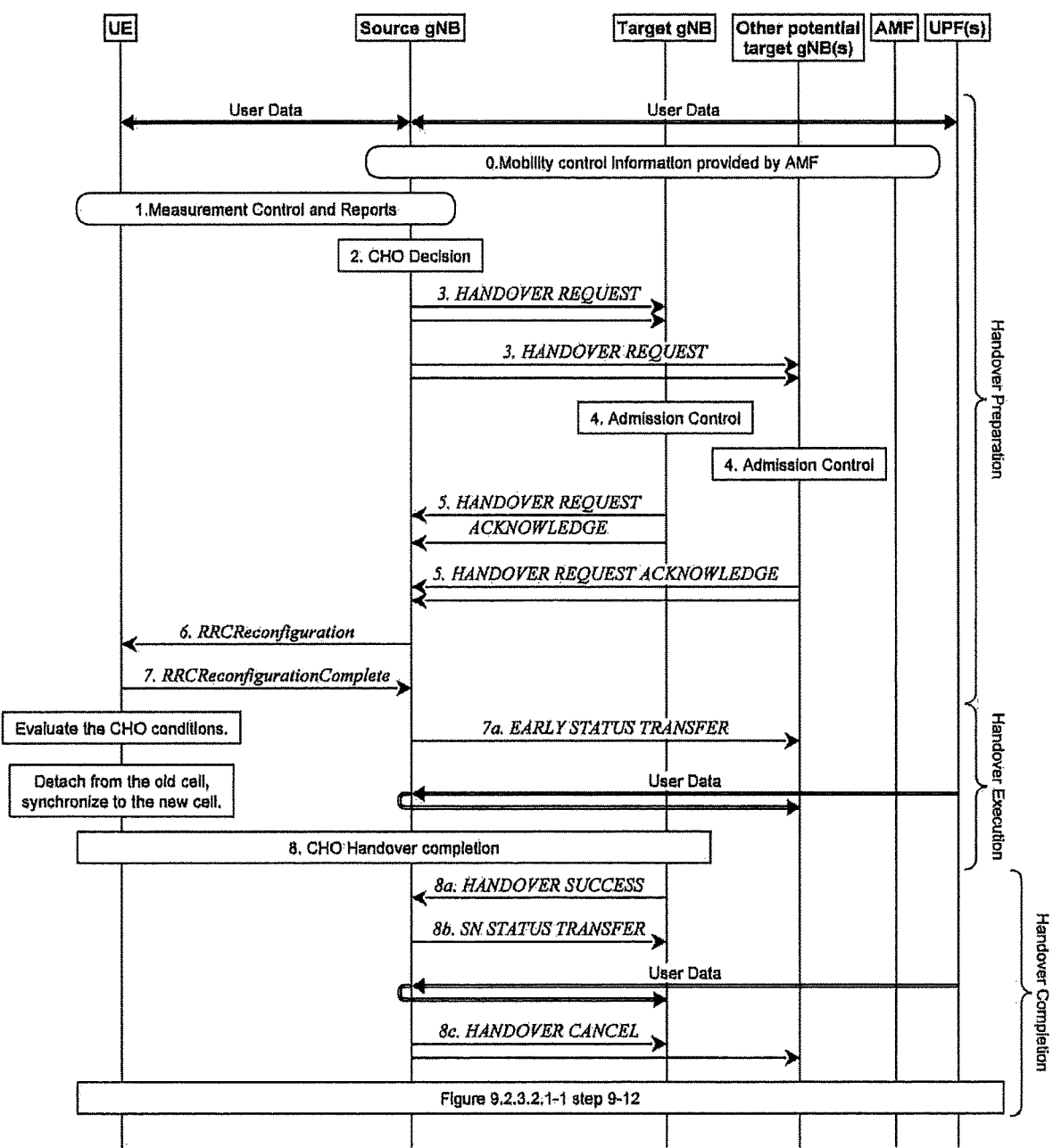
FIG. 2 is a diagram illustrating a conditional handover.

CHO procedure has been introduced in 3GPP Rel. 16 to improve the mobility robustness. In case of CHO, the network may prepare multiple target cells where each conditional handover reconfiguration is associated with a CHO execution condition that is evaluated by the UE. The CHO execution condition refers to a measurement ID associating a measurement object with a reporting configuration and is configured by source gNB. The reporting configuration defines the measurement event (A3 or A5) which triggers the CHO execution. Whenever CHO execution condition is met, the corresponding target configuration is selected and handover is executed towards the selected target cell. The signaling procedure for conditional handover is provided in FIG. 2 as given in TS 38.300.

In this CHO, the source gNB can start early data forwarding of user plane data to all prepared target cells after sending RRC Reconfiguration in step 6 or receiving RRC Reconfiguration Complete in step 7. As the communication with the UE continues after step 6, the source gNB sends to target gNB Early SN Status Transfer message (step 7a)

indicating the packets that have been received by the UE and which shall be deleted from the buffer maintained for each prepared target PCell.

CHO with SCG (Rel. 17)

In Rel. 17, RAN3 has specified the required signaling enhancements to support CHO with SCG where the target MN receiving the handover request from the source node can add and prepare a target SN, i.e., handover to DC connection:

The CHO configuration provided by target node back to source node contains in this case a Master Cell Group (MCG) config to be applied with respect to target PCell and a Secondary Cell Group (SCG) config to be applied with respect to target PSCell.

The CHO execution condition is evaluated by the UE based on the measurements of target PCell, i.e., the measurement of target PSCell are not considered in the evaluation.

The UE performs random access to target PCell and target PSCell when the CHO execution condition is met.

Given that there is time between the CHO preparation and execution, the radio signal quality of the target PSCell may not be sufficient at the time of CHO execution resulting in SCG failure and interruption on the SCG bearers which can be up to 500 ms or more (depending on T304 value supervising the random access to target PSCell). This issue is to be addressed in Rel. 18 by 1) providing a condition (different from CHO execution condition) to decide whether to access the target PSCell/SN, e.g., the condition (e.g. CPAC condition) is evaluated using target PSCell measurements, 2) allowing the target MN to prepare more than one candidate target PSCells/SNs.

As will be further understood from the description below, to overcome the aforementioned issues the UE may start the evaluation of the condition(s) for prepared target PSCells already at the time the UE receives CHO configuration(s). As such, the UE can perform at the same time as measurements for prepared target PCell and target PSCell, and consider their radio link strength/quality when deciding on CHO execution.

In case the PSCell access condition for a prepared target PSCell is met while evaluating the CHO condition, the UE may wait and does not need to perform random access to target PSCell until the CHO condition of the corresponding target PCell is met.

When the CHO condition is met, with features as described herein, it might still be useful to check if a leaving condition of the target PSCell (whose PSCell access condition has been met before) is not met to ensure that the radio signal of target PSCell is still sufficient. If the leaving condition is not met, the UE may execute CHO and performs random access to a target PCell and selected target PSCell. This is a similar principle as was applied to Rel-16 CHO when two execution events were configured.

Otherwise, in one example embodiment, if a leaving condition is met (or if none of the prepared target PSCells have met the PSCell access conditions while evaluating CHO condition), the UE may execute the DC CHO configuration consisting of MCG and SCG configurations, but performs random access only to a target MN. The UE may inform the MN that none of the prepared target PSCells have met the PSCell access condition and, using this information, the MN can reconfigure the UE immediately such as, for example, remapping the SN bearers to MN. Note that delaying PCell access until one of the PSCell access conditions is met is not useful as it can lead to RLF.

Figure 3:
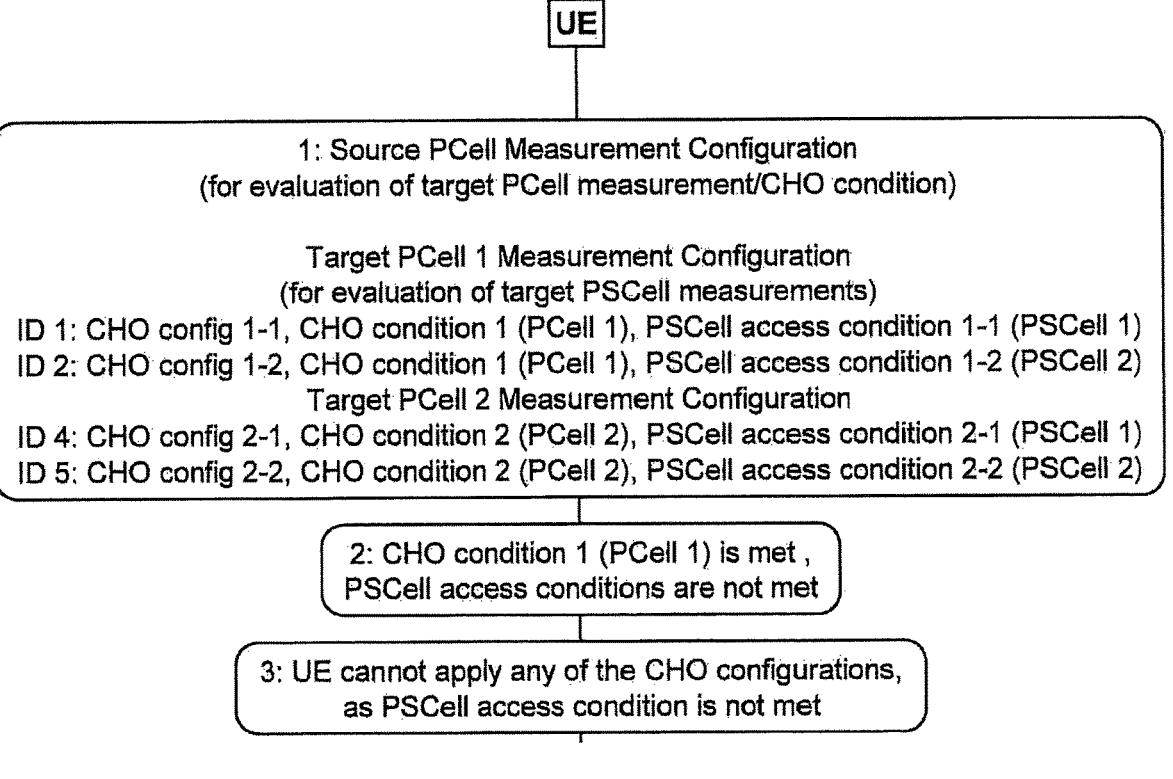
FIG. 3 is a message sequence chart for an example conditional handover and execution.

Referring also to FIG. 3, an example message sequence chart for CHO configuration and execution for an Assumption 1 is shown. For Assumption 1, the UE is configured with a CHO condition that is evaluated using PCell measurements and another PSCell access condition that is evaluated using PSCell measurements. The UE will not execute a DC CHO configuration as long as both conditions are not met.

In one scenario, it may happen that the UE is configured with only DC CHO configuration containing both MCG and SCG configurations. In that case, the UE will evaluate both CHO and PSCell access conditions. Unless both conditions are met, the UE will not apply the DC CHO configurations and perform the random access to the target PSCell. Moreover, this would limit the UE from accessing the target PCell in case PSCell condition is not fulfilled for a target cell. However, this presents a problem/issue:

Issue 1. In case the UE is configured with CHO and PSCell access conditions that works as explained above, the UE may not be able to execute the DC CHO configuration if both the CPAC and CHO conditions are not met.

Figure 4:
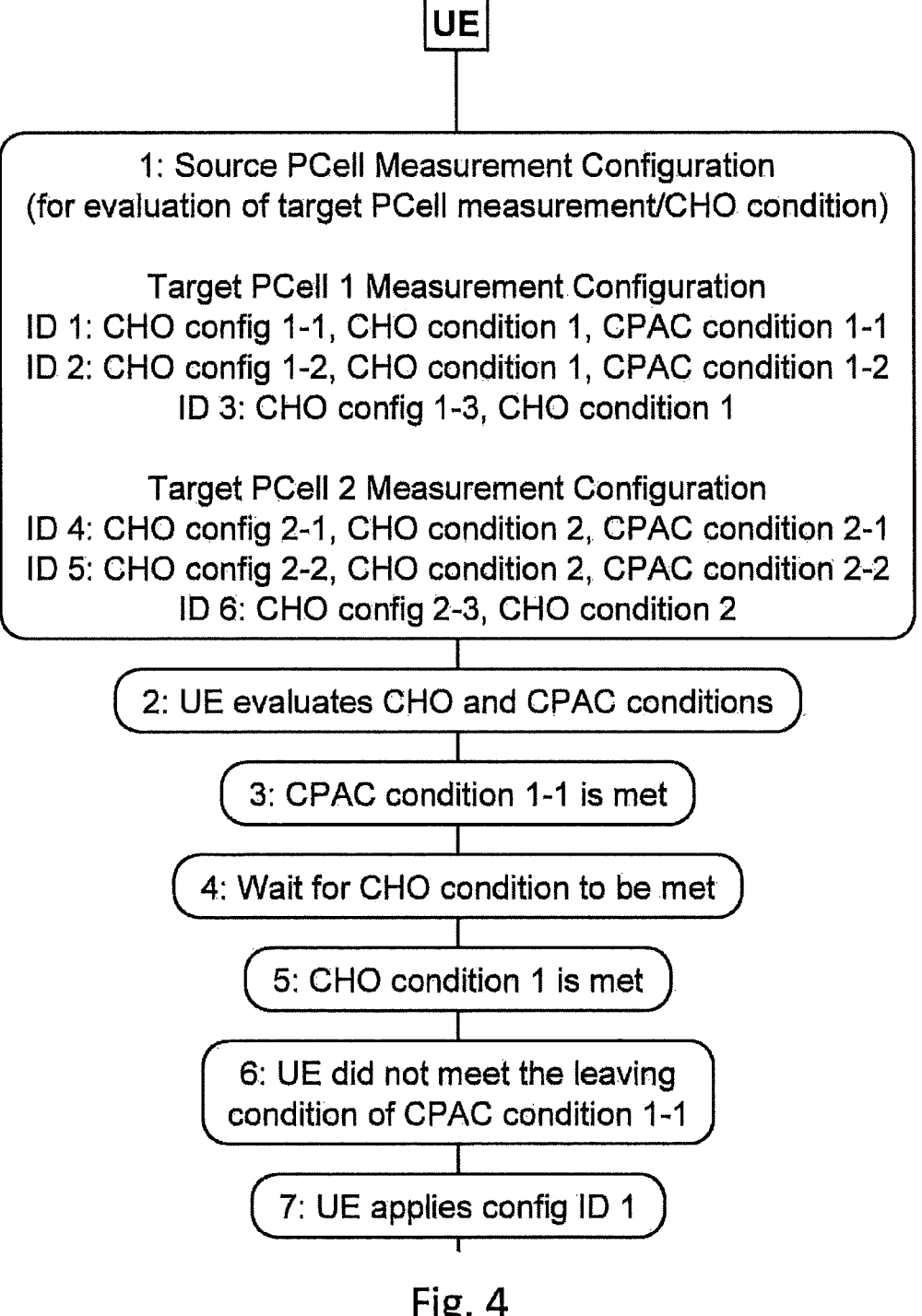
FIG. 4 is a message sequence chart for an example conditional handover and execution.

Referring also to FIG. 4, an example message sequence chart for CHO configuration and execution for an Assumption 2 is shown. For Assumption 2, the UE is configured with a "hard" condition for CHO condition and a "soft" condition for CPAC condition. The soft condition means that the UE can use the CHO config even if the soft condition is not fulfilled.

In one scenario, the UE is configured with DC CHO configuration with SCG configurations and another CHO configuration without SCG configuration (single connectivity configuration). In that case, the UE will receive a hard CHO execution condition and a soft PSCell access condition for CHO configuration with SCG configurations and only a hard PCell access condition for CHO configuration without SCG configuration. Given that the CHO configurations are for the same target PCell e.g., 1 or 2, the same CHO condition is expected to be for all the CHO configurations.

In case the hard PCell access condition is met and PSCell access condition is not met, the UE can select from the available CHO configurations (e.g., CHO ID 1, 2 or 3) as the soft condition allows UE to use other CHO configurations as well. It is not clear if UE will select ID 1 or ID 2 or ID 3. There is no enforced behavior to differentiate between these three configurations and the selection is left to UE implementation. In case UE selects the ID 1 or ID 2 which are DC CHO configurations, there are the following problem/issue:

Issue 2: The UE applies the MCG configuration, where some of the bearers are mapped to SCG but not used. After a while, the target PCell has to reconfigure the UE to re-map the SCG bearers, that could not be set up as the UE didn't establish connection with the SCG, to MCG. This will cause interruption on the SCG bearers in the meanwhile.

In another case, it can happen that the CHO condition is met and PSCell access condition is about to be met, but the PSCell access condition is not met yet. Then, the UE may select the ID 3 which is a single connectivity configuration (only MCG, no SCG) without waiting for the PSCell conditions to be met. However, there will be the following issue/problem:

Issue 3: The UE applies the MCG configuration only which provides less resources to that UE since the UE is under single connectivity (or leads drainage of the limited resources of the target PCell due to overload on single connectivity). The new PCell will reconfigure the UE shortly after the handover (as the PSCell was already about to satisfy the HO condition) which require preparation of PSCell from scratch (extra signaling on both network and air interface). It also leads the UE to suffer from reduced throughput until DC is setup.

With features as described herein, two methods are proposed to ensure that the UE does not experience interruption on SCG bearers in CHO with SCG candidates.

Method 1 (to address issue 1 noted above): Target MN is configured to provide a CHO configuration with single connectivity whenever it adds a CHO with SCG configuration. This behavior is known by the source MN, or the source MN can request from the target MN to provide a CHO configuration without DC. Source MN includes only a PCell access condition to CHO with single connectivity and a condition for PCell and a condition for PSCell for the CHO with dual connectivity. If the PSCell access condition is not fulfilled, the UE may select the CHO configuration without DC (containing only MCG) and execute it. Herein, all the bearers of the UE are served by MN.

Method 2 (to address issue 2 and issue 3 noted above): the UE is informed that, in case the CHO execution condition (for multiple CHO configurations) is met, the UE is provided with a method to prioritize the configuration among the multiple CHO conditions with single and dual connectivity.

In one example embodiment, this behavior is captured in the specification as enforced UE behavior. A general rule may define the priority of CHO configurations such as, for example, a sequence of CHO configurations in a RRC message, or a lower ID of CHO configuration has a higher priority.

In another example embodiment, the source MN can indicate this (indicate the priority of the CHO configurations) to the UE during the conditional handover configuration.

Figure 5:
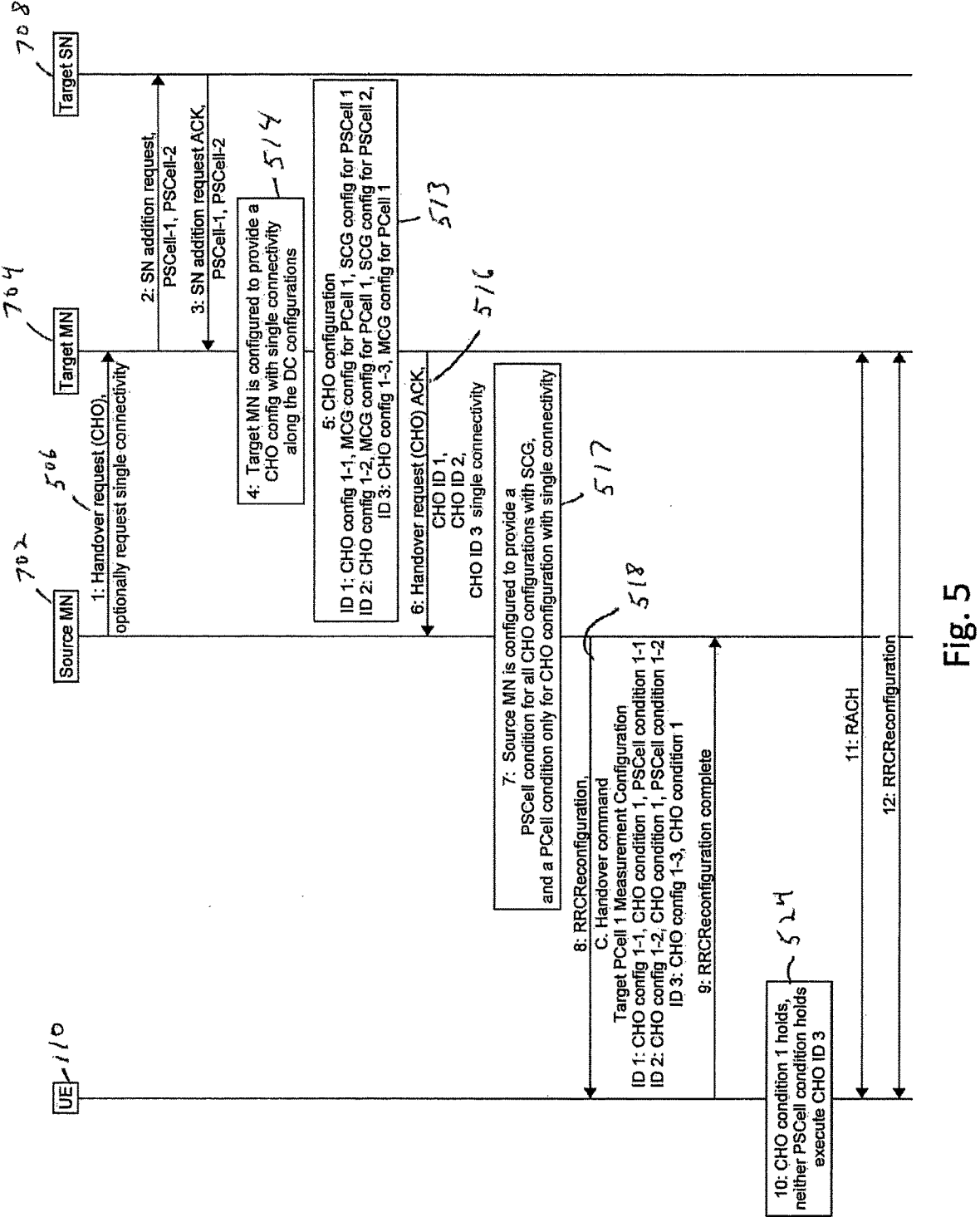
FIG. 5 is a diagram illustrating one example of a message sequence for an example conditional handover.

With features as described herein, connectivity may be maintained and one of the single/dual configurations may be selected according to the priority after the measurements are determined. Referring also to FIG. 5, an example message sequence chart for method 1 is shown. Method 1 is developed for Assumption 1 noted above, where there is only hard conditions. The UE behavior may be guaranteed through the hard conditions, where the network mandatory implementation guarantees that UE is always provided a CHO configuration with single connectivity with the right execution conditions to enable PCell access.

Figure 6:
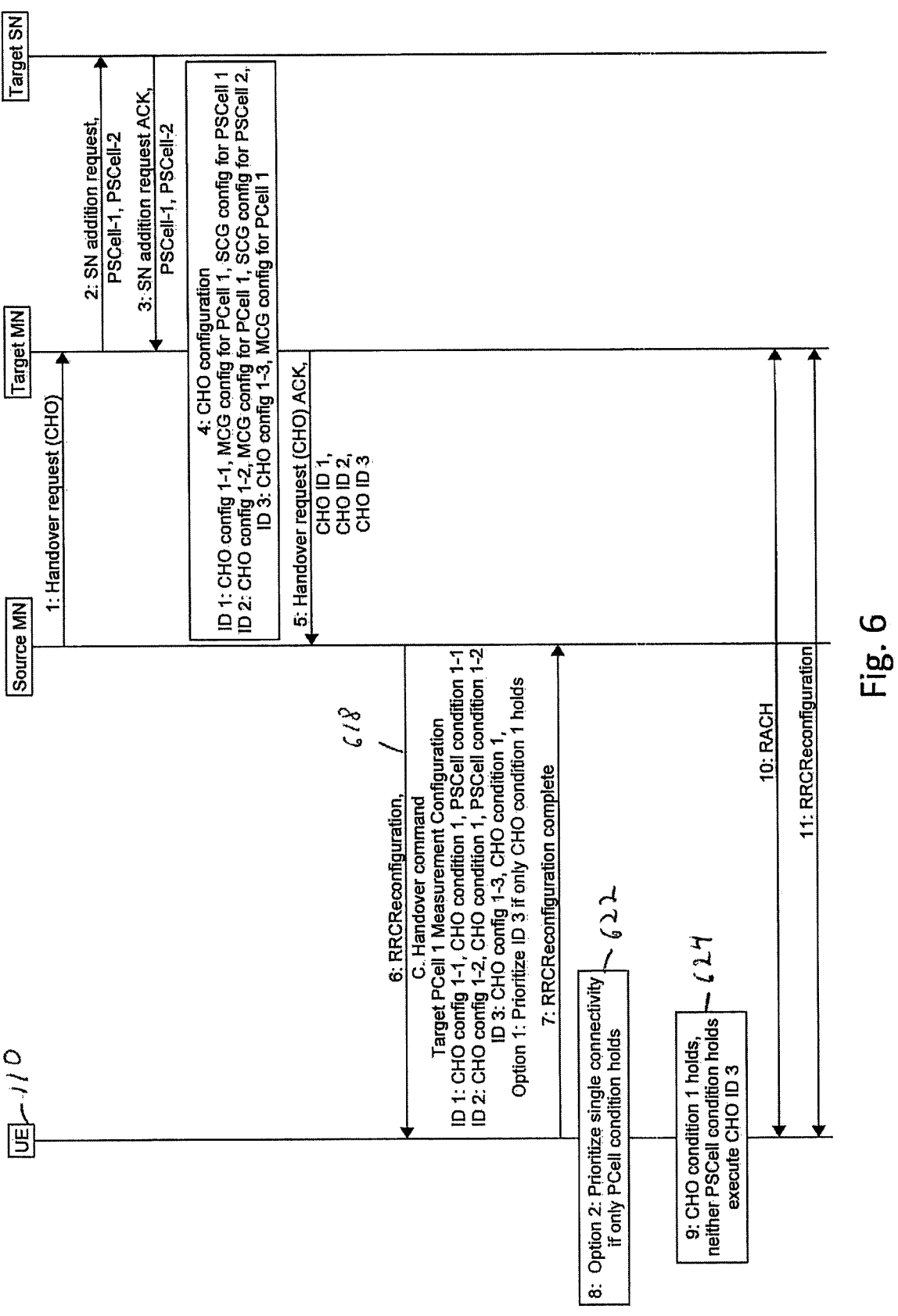
FIG. 6 is a diagram illustrating one example of a message sequence for an example conditional handover.

Referring also to FIG. 6, an example message sequence chart for a method 2a is shown. Method 2a is developed for Assumption 2 as noted above, where there is a hard condition for PCell and a soft condition for PSCell. The UE behavior is achieved through indicating a priority for single connectivity so the UE may select a correct MCG configuration for the PCell access without needing any bearer remapping.

With features as described herein, connectivity may be maintained at the cell boarder and selecting one of the single configuration or the dual configuration according to the priority after the measurements are determined. With the method 2a/2b, the serving MN of a UE may add a priority to the CHO configurations provided to the UE, and the UE behavior may be changed in the sense that CHO configurations with higher priority may be processed before lower priority CHO configurations. This means that CHO conditions which apply for higher priority CHO configuration may get executed immediately and avoids situations where several CHO conditions apply at a same time and might otherwise lead to two potential target cells and the selected cell results from a random UE choice.

The source MN may provide the CHO configurations including a priority to the UE. The UE may process the CHO conditions according to the priority of the CHO configurations, and may execute cell change when CHO condition applies. A new information element (IE) to assign/relate a "priority" to a CHO configuration of a UE at a serving MN may be provided. The new IE "assigned priority" of a CHO configuration may be sent to the UE. In one example this may be sent together with the CHO configuration or related to the identifier of the CHO configuration.

With features as described herein, this may be used to:

Avoid the interruption on SCG bearers in case the UE was not able to apply DC CHO configuration such as, for example, in case the PSCell condition is not met.

Avoid the signaling overhead and delay caused by waiting for a new RRC Reconfiguration from target MN to remap the bearers to MN.

FIG. 6, at step 6, shows an Option 1 where, in this example embodiment, ID 3 is prioritized if only CHO condition 1 holds. This may be used at step 9 where, if the CHO condition 1 holds, and neither PSCell condition holds, the UE may execute CHO ID 3. Step 8 in FIG. 6 illustrates an Option 2, where the UE may prioritize single connectivity if only a PCell condition holds. The preparation part of Option 1 may be merged in Option 2; preparation parts where the Source MN interacts with the Target SN. For Option 1, the Source MN may indicate to the UE what to do via the messaging at step 6 for example. For Option 2, in one example embodiment, the UE may be pre-configured to consider priority accordingly. In one type of alternate embodiment, Option 2 may be signaled to the UE as a configuration setting. Step 9, which may use Option 1 information, may follow after step 8 to execute CHO ID 3; based upon the information from the Source MN to the UE during step 6.

Figure 7:
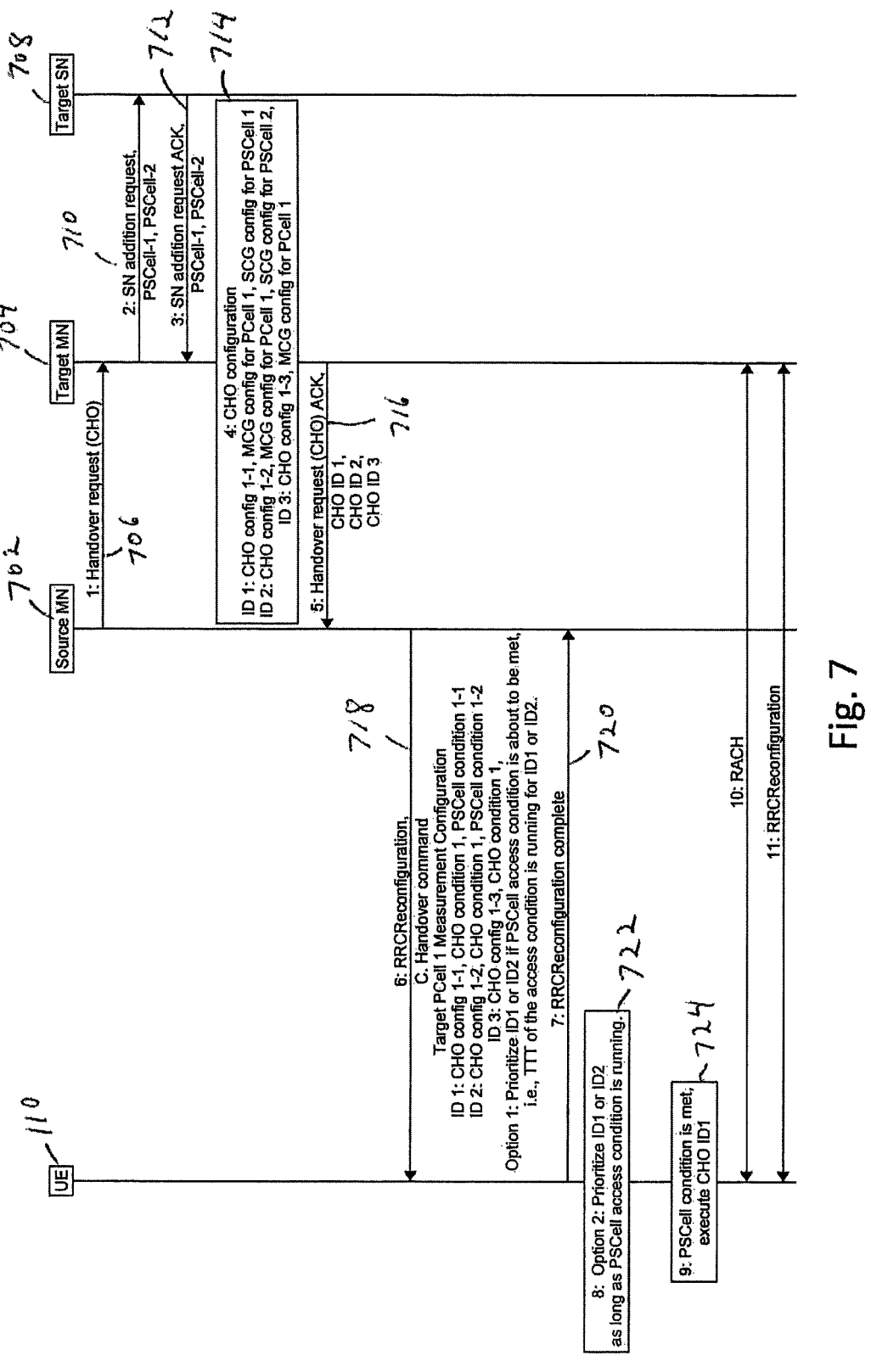
FIG. 7 is a diagram illustrating one example of a message sequence for an example conditional handover.

Referring also to FIG. 7, an example message sequence chart for a method 2b is shown. In Method 2b, the network configures the UE such that the UE will consider DC if the DC handover is likely to happen. Here, the UE is configured with a condition such that UE will not execute the CHO ID1 immediately after the CHO condition is met, but the UE checks whether one of the PSCell conditions is about to be met such as, for example, if a timer Time-To-Trigger (TTT) of the PSCell access is running. If the PSCell condition is about to be met, the UE may wait until the condition is completely met, and then execute the DC handover. If the condition stops to be met such as, for example, the TTT stops running, or it was not running at all, then the UE may consider CHO ID3 as it was proposed in method 2a.

The Time-To-Trigger (TTT) is a timer that starts running when a target PSCell power satisfies a certain condition. This condition may be, for example:

1) a comparison of the target PSCell power against a threshold, such as, for example, PSCell is stronger than a threshold (A5 event);

2) a comparison of the target PSCell power against the serving PSCell power with an offset, such as, for example, target PSCell is 3 dB (or more offset value) stronger than the serving PSCell power.

If the target PSCell power satisfies the configured condition (one of two above), the UE does not execute the handover immediately. Instead, the UE may observe whether this condition is satisfied for a certain period of time (TTT) to make sure that the observation was not an outlier event (it can happen that the condition is temporarily satisfied due to fluctuations on the measurements) and the cell change is actually reasonable, advised and going to be executed.

Hence, the UE will not suffer from single connectivity until it is reconfigured back to dual connectivity after handover. The serving MN does not need to reconfigure the UE with DC by proceeding a secondary node (SN) addition procedure right after the CHO execution (the PSCell becomes good right after the CHO execution).

The UE may provide a capability indication to a network node, indicating to support conditional handover which include priority information. The priority information which is assigned to the conditional handover configuration, may be followed up at UE such as, for example, by evaluating conditional handover configurations according to assigned priority. The UE may provide a capability indication to a network node, indicating to support the feature to wait for a running TTT to expire before selecting on a target cell of a handover configuration.

With reference to FIG. 7, in this example embodiment the Source MN 702 may send a handover request (CHO) to the Target MN 704 in step 1 as indicated by 706. The Target MN 704 may send a SN additional request to the Target SN 708 in step 2 as indicated by 710. The Target SN 708 may send a SN addition request ACK to the Target MN 704 at step 3 as indicated by 712. At step 4, the Target MN 704 may form the CHO configuration; and example is shown at 714. This example 714 has three (3) IDs; ID 1, ID 2 and ID 3. The Target MN 704 may send a handover request (CHO) ACK to the Source MN 702 in step 5 as indicated by 716. In this example 716 includes CHO ID 1, CHO ID 2 and CHO ID 3. The Target MN 702 may send a RRCReconfiguration to the UE 110 in step 6 as indicated by 718. This may include the handover command as detailed in FIG. 7 with ID 1, ID 2 and ID3. In this example this comprises:

ID 1: CHO config 1-1, CHO condition 1, PSCell condition 1-1

ID 2: CHO config 1-2, CHO condition 1, PSCell condition 1-2

ID 3: CHO config 1-3, CHO condition 1, Option 1: Prioritize ID 1 or ID 2 if PSCell access condition is about to be met. Please note that the three CHO IDs are merely an example and should not be considered as limiting. The UE 110 may send a RRCReconfiguration complete at step 7 to the Source MN 702 as indicated by 720. At step 8, the UE 110 may utilize Option 2 to prioritize 722 ID 1 or ID 2 as long as PSCell access condition is running, such as the when the PSCell condition is not yet met for example. However, when the PSCell access condition is met, as indicated with step 9, the UE 110 may then execute 724 the prioritized ID; in the example of FIG. 7 this is CHO ID 1. In the event that the PSCell is not running at step 8, the process may proceed as indicated in FIG. 6.

In the example shown in FIG. 6, at step 6 ID 3 may be indicated as ID 3: CHO config 1-3, CHO condition 1, Option 1: prioritize ID 3 if only CHO condition 1 holds. At step 8 in FIG. 6, the UE 110 may perform the option to prioritize 622 single connectivity if only PCell condition holds. Then, at step 9, the UE 110 may execute 624 Option 1 in the RRCReconfiguration message 618 using CHO ID 3 when it is determined that CHO condition 1 holds and neither PSCell condition holds.

Please note that in one example embodiment features of method 2a might not be performed after features of method 2b is performed; another alternative method might be per-formed after features of method 2b are performed. Features of method 2a may also be performed without use of features of method 2b.

As noted above, in one type of example single connectivity may be prioritized such as at step 8 in FIG. 6 for example. Referring back to FIG. 5, there is shown another example method in regard to single connectivity. With the example shown in FIG. 5, the Source MN 702 at step 1 may send the handover request (CHO) as indicated by 506 which may optionally request single connectivity. Steps 2 and 3 may be the same as in FIG. 7. At step 4, the Target MN 704 may be configured to provide a CHO config with single connectivity along the DC configurations as indicated by 514. At step 5 the Target MN may provide a CHO configuration as indicated by the example 513 as shown in FIG. 5. At step 6, the handover request (CHO) ACK may be sent 516 by the Target MN 704 to the Source MN 702 with CHO ID 1, CHO ID 2 and CHO ID3 where CHO ID 3 indicates single connectivity. At step 7 the Source MN 702 may be config-ured as indicated by 517 to provide a PSCell condition for all CHO configurations with SCG, and a PCell condition only for CHO configuration with single connectivity. At step 8 the RRCReconfiguration may be sent as indicated by 518 to include ID 1, ID 2 and ID 3 where ID 3 comprises CHO config 1-3, CHO condition 1. Thus, at step 10, the UE 110 may be configured such that if CHO condition 1 holds, and neither PSCell condition holds, the UE may execute 524 CHO ID 3 with single connectivity.

In one type of example embodiment at least some of the features from method 1 (see FIG. 5) may be performed with features from method 2 (see FIGS. 6-7). At least some of the features from method 1 may be used with at least some of the features from method 2 to make sure single connectivity is prepared in certain cases. In one example, if the target node does not provide both single and dual connectivity configurations, there is nothing to be prioritized on the serving cell side. On the other hand, as another different example, the target may already provide both single and dual connectivity configurations even without source gNB requests. For this second different example, then method 1 does not help with method 2; where method 2 is a standalone solution. However, for the first example, one may need an additional mechanism on top of at least some of the features from method 1 to have diverse configurations such that features from method 1 can make prioritization over the diverse configurations (single/dual). In some alternate embodiments, at least some of the features of method 1 and method 2 may be practiced separately or independently; at least some of the features of method 1 need not be performed with at least some or all of the features of the method 2, and at least some of the features of method 2 need not be performed with at least some or all of the features of the method 1.

The UE may select a conditional handover configuration according to priority information. The UE may receive the priority information from network entity. The UE may apply priority; and the received priority may request the UE to wait for a running TTT of a PSCell to expire at the UE before the UE executes a single connectivity handover/PCell cell change. The UE may apply priority on a plurality of con-ditional handovers. The UE may prioritize PCell change. The UE may prioritize PCell change only if PSCell condi-tions are not provided. The UE may prioritize changing to single connectivity over changing to dual connectivity. The received priority information may correspond to this behav-ior, and the UE may execute according to the received priority.

FIGS. 5, 6 and 7 show some examples of handover commands at the RRCReconfiguration signaling. However, these examples should not be considered as limiting. The handover information in the handover commands may comprise one or more of conditional handover configuration information, measurement configuration information and conditional handover priority information as illustrated by the examples in the figures.

The MN may decide on priority among conditional handover configurations. The MN may put priority to dual connectivity cell changes over single connectivity cell changes, or the other way around. The UE may need to follow this priority.

The UE behavior may result from the priority assigned at the MN to the conditional handover configurations. The MN may assign higher priority to dual connectivity handover configurations (which include conditions/measurements on PCell and PSCells) than to single handover configurations (which do not include PSCell configurations). But this is only one possible preference. The UE may be requested to delay selection of target cell/handover configuration until a running TTT expires; which may increase the number of dual connectivity cell changes and avoids subsequent reconfigurations. The priority information may trigger the UE to do so.

In accordance with one example embodiment, an apparatus is provided comprising: at least one processor; and at least one non-transitory memory storing instructions that, when executed with the at least one processor, cause the apparatus to: determine that a conditional handover condition is met; and based upon the determining that the conditional handover condition is met and based, at least partially, on a priority information, select a conditional handover configuration from at least one conditional handover configuration to perform a conditional handover.

The at least one memory and the instructions may be configured to, with the at least one processor, cause the apparatus to receive handover information from a network entity, where the handover information comprises one or more of conditional handover configuration information, measurement configuration information and conditional handover priority information, where the conditional handover priority information comprises the priority information. The conditional handover priority information may comprise information indicating that priority is to be given to a first conditional handover configuration relative to a second conditional handover configuration. The priority information may be indicated as being dependent upon at least one parameter. The at least one parameter may comprise when: a PSCell access condition determination is running, and the PSCell access condition has not been met. The at least one memory and the instructions may be configured to, with the at least one processor, cause the apparatus to prioritize a different conditional handover configuration while the PSCell access condition is running and has not been met. The at least one memory and the instructions may be configured to, with the at least one processor, cause the apparatus to execute the different conditional handover configuration after the PSCell condition is met. The at least one memory and the instructions may be configured to, with the at least one processor, cause the apparatus to receive, from a network entity, a plurality of conditional handover conditions, and the determining that the conditional handover condition is met is based upon at least one of the received plurality of conditional handover conditions. The priority information may comprise priority information pre-configured in the apparatus. The at least one parameter may comprise when only a CHO condition 1 holds. The at least one parameter may comprise when only a PCell condition holds. The at least one memory and the instructions may be configured to, with the at least one processor, cause the apparatus to prioritize single connectivity if a PCell condition is present. The at least one memory and the instructions may be configured to, with the at least one processor, cause the apparatus to select a first one of at least two conditional handover configurations, with the first conditional handover configuration being prioritized over other one(s) of the at least two conditional handover configurations, when a PSCell access condition is running in the apparatus. The at least one memory and the instructions may be configured to, with the at least one processor, cause the apparatus to select and execute the first conditional handover or a different one of the at least two conditional handover configurations based upon the priority information and when the PSCell condition is met. The at least one memory and the instructions may be configured to, with the at least one processor, cause the apparatus to provide a capability indication to a network node, indicating to support conditional handover which includes priority information.

In an example embodiment, an example method may be provided comprising: determining that a conditional handover condition is met by a user equipment; and based upon the determining that the conditional handover condition is met and based, at least partially, on a priority information, selecting by the user equipment a conditional handover configuration from at least one conditional handover configuration to perform a conditional handover.

In an example embodiment, a non-transitory program storage device readable by an apparatus, tangibly embodying a program of instructions executable with the apparatus for performing operations, may be provided. The operations may comprise: determining that a conditional handover condition is met; and based upon the determining that the conditional handover condition is met and based, at least partially, on a priority information, selecting a conditional handover configuration from at least one conditional handover configuration to perform a conditional handover.

In accordance with one example embodiment, an apparatus is provided comprising: means for determining that a conditional handover condition is met; and means, based upon the determining that the conditional handover condition is met and based, at least partially, on a priority information, for selecting a conditional handover configuration from at least one conditional handover configuration to perform a conditional handover.

In accordance with one example embodiment, an apparatus is provided comprising: at least one processor; and at least one non-transitory memory storing instructions that, when executed with the at least one processor, cause the apparatus to: receive handover information; and based, at least partially, upon the receiving of the handover information, send the handover information to a user equipment with conditional handover priority information.

The at least one memory and the instructions may be configured to, with the at least one processor, cause the apparatus to form the conditional handover priority information with at least one parameter for use in prioritizing a first conditional handover configuration over a second conditional handover configuration. The at least one parameter may comprise when a PSCell access condition is about to be met. The at least one parameter may comprise whether a timer time-to-trigger (TTT) of the PSCell access condition is running. The at least one parameter may comprise to wait with conditional handover configuration selection until expiry or stop of a timer time-to-trigger (TTT) of the PSCell. The at least one parameter may comprise when a first conditional handover condition exists and at least one other conditional handover condition does not exist.

As noted above, the UE may provide a capability indication to a network node indicating to support conditional handover. That capability indicator may indicate, for example, support to include CHO priority information or support to include the feature to wait for a running TTT to expire before selecting on a target cell of a handover configuration. The network node may then use that capability indicator in order to subsequently configure/instruct the UE as noted above only if the network and/or network node and/or UE supports this type of CHO. Thus, the instructions at the network node may be configured to cause the network node to receive a capability indicator from the user equipment to then configure or instruct the user equipment such as, for example, at least one of: CHO priority information, or wait for expiry of a running timer time-to-trigger, but only when the UE supports this type of CHO. If no such capability information is received by the network node from a UE, then the network node might be configured to not send the information to the UE regarding CHO including priority information or waiting until expiry of TTT.

In an example embodiment, an example method may be provided comprising: receiving handover information comprising measurement configuration information; and based, at least partially, upon the receiving of the handover information, sending the handover information to a user equipment with conditional handover priority information.

In an example embodiment, a non-transitory program storage device readable by an apparatus, tangibly embodying a program of instructions executable with the apparatus for performing operations, may be provided. The operations may comprise: receiving handover information comprising measurement configuration information; and based, at least partially, upon the receiving of the handover information, sending the handover information to a user equipment with conditional handover priority information.

In accordance with one example embodiment, an apparatus is provided comprising: means for receiving handover information; and means, based at least partially upon the receiving of the handover information, for sending the handover information to a user equipment with conditional handover priority information.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
at least one processor; and
at least one memory storing instructions that, when executed with the at least one processor, cause the apparatus to at least:
determine that a conditional handover condition is met;
based upon the determining that the conditional handover condition is met and based, at least partially, on a priority information, select a conditional handover configuration from at least one conditional handover configuration to perform a conditional handover to a primary secondary cell;
prioritize a different conditional handover configuration while a primary secondary cell access condition is running and has not been met;
execute the different conditional handover configuration after the primary secondary cell access condition is met; and
receive, from a network entity, a plurality of conditional handover conditions;
where the priority information is indicated as being dependent upon at least one parameter;
the at least one parameter comprises when primary secondary cell access condition determination is running, and the primary secondary cell access condition has not been met; and
the determining that the conditional handover condition is met is based upon at least one of the received plurality of conditional handover conditions.

2. The apparatus as claimed in claim 1 where the at least one memory and the instructions are configured to, with the at least one processor, cause the apparatus to at least:
receive handover information from a network entity, where the handover information comprises one or more of conditional handover configuration information, measurement configuration information and conditional handover priority information, where the conditional handover priority information comprises the priority information.

3. The apparatus as claimed in claim 2 where the conditional handover priority information comprises information indicating that priority is to be given to a first conditional handover configuration relative to a second conditional handover configuration.

4. The apparatus as claimed in claim 1 where the priority information comprises priority information pre-configured in the apparatus.

5. The apparatus as claimed in claim 1 where the at least one parameter comprises when only a conditional handover condition 1 holds.

6. The apparatus as claimed in claim 1 where the at least one parameter comprises when only a primary serving cell condition holds.

7. The apparatus as claimed in claim 1 where the at least one memory and the instructions are configured to, with the at least one processor, cause the apparatus to at least:
prioritize single connectivity if a primary serving cell condition is present.

8. The apparatus as claimed in claim 1 where the at least one memory and the instructions are configured to, with the at least one processor, cause the apparatus to at least:
select a first one of at least two conditional handover configurations, with the first conditional handover configuration being prioritized over other one(s) of the at least two conditional handover configurations, when the primary secondary cell access condition is running in the apparatus.

9. The apparatus as claimed in claim 8 where the at least one memory and the instructions are configured to, with the at least one processor, cause the apparatus to at least:
select and execute the first conditional handover or a different one of the at least two conditional handover configurations based upon the priority information and when the primary secondary cell condition is met.

10. The apparatus as claimed in claim 1, where the at least one memory and the instructions are configured to, with the at least one processor, cause the apparatus to at least:

provide a capability indication to a network node, indicating to support conditional handover which includes priority information.

11. A method comprising:

determining that a conditional handover condition is met by a user equipment;

based upon the determining that the conditional handover condition is met and based, at least partially, on a priority information, selecting by the user equipment a conditional handover configuration from at least one conditional handover configuration to perform a conditional handover to a primary secondary cell;

prioritizing a different conditional handover configuration while the primary secondary cell access condition is running and has not been met;

executing the different conditional handover configuration after the primary secondary cell condition is met; and receiving, from a network entity, a plurality of conditional handover conditions;

where the priority information is indicated as being dependent upon at least one parameter;

the at least one parameter comprises when primary secondary cell access condition determination is running, and the primary secondary cell access condition has not been met; and the determining that the conditional handover condition is met is based upon at least one of the received plurality of conditional handover conditions.

12. The method as claimed in claim 11 further comprising receiving handover information from a network entity, where the handover information comprises one or more of conditional handover configuration information, measurement configuration information and conditional handover priority information, where the conditional handover priority information comprises the priority information.

13. The method as claimed in claim 12 where the conditional handover priority information comprises information indicating that priority is to be given to a first conditional handover configuration relative to a second conditional handover configuration.

14. The method as claimed in claim 11 where the priority information comprises priority information pre-configured in the user equipment.

15. A non-transitory program storage device readable by an apparatus, tangibly embodying a program of instructions executable with the apparatus for performing operations, the operations comprising:

determining that a conditional handover condition is met;

based upon the determining that the conditional handover condition is met and based, at least partially, on a priority information, selecting a conditional handover configuration from at least one conditional handover configuration to perform a conditional handover to a primary secondary cell;

prioritizing a different conditional handover configuration while the primary secondary cell access condition is running and has not been met;

executing the different conditional handover configuration after the primary secondary cell condition is met; and receiving, from a network entity, a plurality of conditional handover conditions:

where the priority information is indicated as being dependent upon at least one parameter;

the at least one parameter comprises when primary secondary cell access condition determination is running, and the primary secondary cell access condition has not been met; and the determining that the conditional handover condition is met is based upon at least one of the received plurality of conditional handover conditions.

16. The non-transitory program storage device as claimed in claim 15 where the operations further comprise receiving handover information from a network entity, where the handover information comprises one or more of conditional handover configuration information, measurement configuration information and conditional handover priority information, where the conditional handover priority information comprises the priority information.

17. The non-transitory program storage device as claimed in claim 16 where the conditional handover priority information comprises information indicating that priority is to be given to a first conditional handover configuration relative to a second conditional handover configuration.

18. The non-transitory program storage device as claimed in claim 15 where the priority information comprises priority information pre-configured in the apparatus.

* * * * *